May 8, 1928.
R. C. PIERCE
TIRE BEAD REENFORCING ELEMENT
Filed Feb. 25, 1927
1,669,173
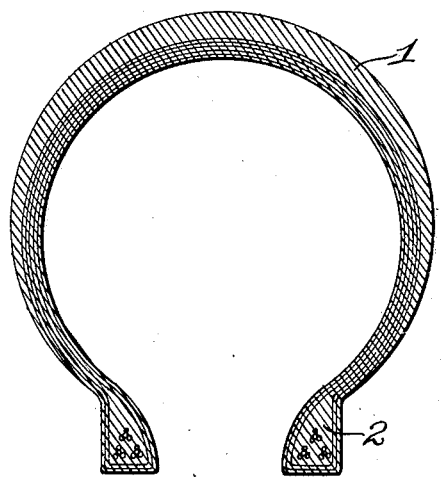
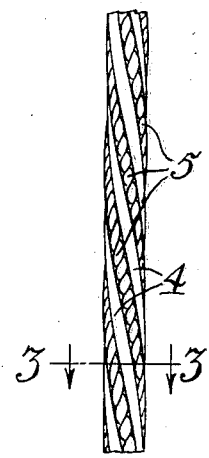
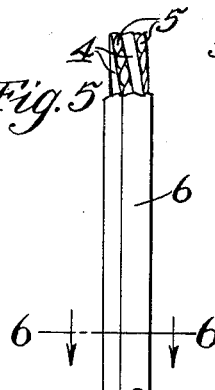
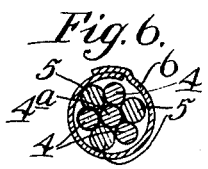
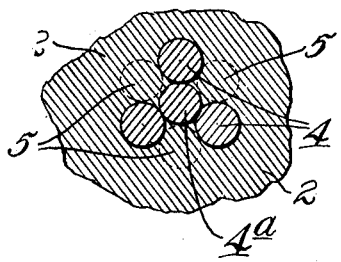
Inventor:
Robert C. Pierce,
By Dyrenforth, Lee, Chritton & Wiles,
Attys.

Patented May 8, 1928.

1,669,173

UNITED STATES PATENT OFFICE.

ROBERT C. PIERCE, OF NILES, MICHIGAN, ASSIGNOR TO NATIONAL STANDARD COMPANY, A CORPORATION OF MICHIGAN.

TIRE-BEAD-REENFORCING ELEMENT.

Application filed February 25, 1927. Serial No. 171,003.

This invention relates to improvements in tire-bead reenforcing elements, and more especially to such an element adapted for use in the bead of a casing for a pneumatic tire.

Among the features of my invention is the provision of a reenforcement, or reenforcing element, which may be easily and cheaply manufactured and which is substantially non-stretchable. The reenforcing element also may be conformed or folded longitudinally without placing undue stress upon the individual strands or tension members. My improved reenforcing element is also so constructed that in the forming of a bead, the pressure and curing will cause the element to become firmly imbedded in and interlocked with the rubber compound of which the bead is made, thus forming practically a unitary structure.

Other features and advantages of my invention will appear more fully as I proceed with my specification.

In that form of device embodying the features of my invention shown in the accompanying drawings, Fig. 1 is a vertical sectional view of the pneumatic tire casing, Fig. 2 is a plan view of the improved reenforcing element, Fig. 3 is a view taken as indicated by the line 3—3 of Fig. 2, Fig. 4 is an enlarged vertical sectional view through the element showing the same imbedded in a tire bead, Fig. 5 is a view similar to Fig. 2 showing a modified form, Fig. 6 is a view taken as indicated by the line 6—6 of Fig. 5, and Fig. 7 is a view similar to Fig. 5 showing another modified form.

As shown in the drawings, 1 indicates a conventional pneumatic tire casing provided with the usual bead 2, which is formed of a suitable rubber composition, the bead being of a cross-section corresponding to the tire in which it is desired to use the same.

Imbedded in the bead proper 2 is a reenforcement, or reenforcing element, formed of a plurality of tension members and rubber-compound carrying members spirally twisted together. The tension members may be made of any suitable material such as, for example, metal wires.

The reenforcing element is shown in Fig. 2 before it is put in the tire bead. This element consists of a central member $4^a$. This member may be of any suitable material and I prefer to make it a tension member. For example, it may be a metal wire. Three other wires 4 are spirally wound or twisted about the central member $4^a$. Lying between the wires 4 and parallel therewith are three-rubber compound carrying members 5, which may be made of any suitable material. For example, these rubber-compound carrying members may be strings or cords. In the formation of the element the members 5 are preferably put on dry and then impregnated with rubber compound. When impregnated the members 5 absorb enough rubber compound and act as carriers thereof, so that when the element is in place in the bead, during the curing process, the rubber compound thus carried by these members unites with the rubber compound of the bead thus making a complete bond between the element and the bead. I have attempted to show this action in Fig. 4 which illustrates more or less diagrammatically the element in place in the bead 2 after the curing. I have indicated the rubber-compound carriers in broken lines in this figure to show that the rubber compound carried by these members has united with the rubber compound 2 of which the bead is composed to form practically a solid continuous mass of rubber compound in which the wires 4 and $4^a$ are entirely imbedded.

In Figs. 5 and 6 I have shown a modified form of device in which the element is substantially the same as that shown in Fig. 2 except that it is incased in a covering 6 of fibrous material, and preferably woven fibrous material. This woven fibrous material may or may not be impregnated with rubber compound. When so impregnated, in the formation of the tire bead, during the curing, the rubber compound thus carried by the covering 6 assists in uniting the rubber compound carried by the members 5 with the rubber compound of the bead 2 to form a solid mass of such material. If the covering 6 is not impregnated with rubber compound, the bonding or uniting between the rubber compound carried by the members 5 and the bead material itself takes place. Nevertheless, since, during the curing process rubber compound from the members 5 and from the bead will pass back and forth through the interstices of the fibrous covering 6 and unite to form a substantially homogeneous mass.

In the modified form shown in Fig. 7 the element is formed substantially the same as the one illustrated in Fig. 5 except that the covering of fibrous material 6 is put on by spirally wrapping the same as shown instead of forming one long fold or wrap.

My improved reenforcing element, being comprised of members spirally twisted together, forms a self-sustaining structure that can easily be handled, stored, and shipped. It is ready for immediate use in the manufacture of a tire bead at any time. The rubber-compound carriers 5 impregnated with rubber compound make it unite solidly with the rubber compound of a bead in the manufacture thereof. The tension members may be fewer or more in number than I have shown and likewise the number of rubber-compound carrying members may be varied. The tension members may be of any suitable material in order to give the requisite tensile strength, and their number and size should be gaged to give the strength desired.

In the manufacture of the tire bead, the element is convolutely disposed and imbedded in the tire bead, a sufficient number of convolutions being formed to give the requisite reenforcement to the bead. These convolutions may be disposed within the bead as desired, for example, in case the bead has a triangular cross-section, as shown in Fig. 1, there may be two convolutions of the reenforcing element side by side and a third convolution on top.

While I have shown and described certain embodiments of my invention, it is to be understod that it is capable of many modifications. Changes, therefore, in the construction and arrangement may be made without departing from the spirit and scope of the invention as disclosed in the accompanying claims, in which it is my intention to claim all novelty inherent in my invention as broadly as possible in view of the prior art.

What I claim as new, and desire to secure by Letters Patent, is:

1. A tire-bead reenforcing element consisting of a tension member and a rubber-compound carrying member parallel to each other and spirally twisted together.

2. A tire-bead reenforcing element consisting of a tension member and a rubber-compound carrying member parallel to each other and spirally twisted together about a central member.

3. A tire-bead reenforcing element consisting of a plurality of tension members and rubber-compound carrying members parallel to each other and spirally twisted together.

4. A tire-bead reenforcing element consisting of a plurality of tension members and rubber-compound carrying members parallel to each other and spirally twisted together about a central member.

5. A tire-bead reenforcing element consisting of a tension member and a rubber-compound carrying member parallel to each other and spirally twisted together, both of said members being encased in fibrous material.

6. A tire-bead reenforcing element consisting of a tension member and a rubber-compound carrying member parallel to each other and spirally twisted together about a central member, all of said members being encased in fibrous material.

7. A tire-bead reenforcing element consisting of a plurality of tension members and rubber-compound carrying members parallel to each other and spirally twisted together, all of said members being encased in fibrous material.

8. A tire-bead reenforcing element consisting of a plurality of tension members and rubber-compound carrying members parallel to each other and spirally twisted together about a central member, all of said members being encased in fibrous material.

In witness whereof, I have hereunto set my hand this 21st day of February, A. D. 1927.

ROBERT C. PIERCE.